United States Patent [19]
Jager et al.

[11] 3,869,490
[45] Mar. 4, 1975

[54] ESTERS
[75] Inventors: Gerhard Jager; Carl Metzger, both of Wuppertal-Elberfeld; Ludwig Eue; Robert Schmidt, both of Cologne, all of Germany
[73] Assignee: Farbenfabriken Bayer Aktiengesellschaft, Leverkusen, Germany
[22] Filed: June 23, 1972
[21] Appl. No.: 265,926

[30] Foreign Application Priority Data
July 9, 1971  Germany............................ 2134173

[52] U.S. Cl.................... 260/455 A, 71/88, 71/92, 71/100, 260/247.1, 260/247.2 B, 260/268 S, 260/268 R, 260/343.2 R
[51] Int. Cl........................................... C07c 155/02
[58] Field of Search................................ 260/455 A

[56] References Cited
OTHER PUBLICATIONS
Chem. Abstracts, pp. 5504–5, Vol. 55

*Primary Examiner*—Lewis Gotts
*Assistant Examiner*—D. R. Phillips
*Attorney, Agent, or Firm*—Burgess, Dinklage & Sprung

[57] ABSTRACT
Compounds of the formula:

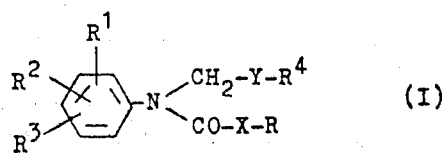

(I)

in which
R and $R_4$ are, e.g., optionally substituted aliphatic hydrocarbyl;
$R^1$, $R^2$, and $R^3$ represent hydrogen, alkyl, cycloalkyl, alkoxy, haloalkyl and/or halogen;
Furthermore $R^2$ and $R^3$ conjointly may represent a —$(CH)_4$— grouping to form a fused benzene ring with the adjacent atoms of the phenyl ring shown in the formula
X is sulfur;
Y is oxygen, sulfur or a group of the formula

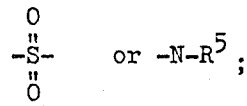

are outstandingly effective herbicides particularly when used as selective herbicides and are outstandingly tolerated by crop plants.

30 Claims, No Drawings

ESTERS

The present invention relates to certain new naryl-carbamic acid thiolester compounds to herbicidal compositions containing them and to their use as herbicides.

It has already been disclosed that N-phenylcarbamic acid esters, for example N-phenylcarbamic acid isopropyl ester and N-3-chlorophenyl-carbamic acid isopropyl ester, display herbicidal properties (compare U.S. Patent Specification 3,334,989 and German Auslegeschriften (German Published Specifications) 1,159,432 and 1,188,588).

However, the herbicidal action of N-phenylcarbamic acid isopropyl ester is not satisfactory if desirably low amounts and concentrations are used, especially against broadleafed weeds and against varieties of millet, both when applied by the pre-emergence method and the post-emergence method. N-3-chlorophenyl-carbamic acid is opropyl ester, on the other hand, is effective against broad-leafed weeds and varieties of millet, but its toleration by crop plants is less, so that, for example, it cannot be employed for the selective combating of weeds in beet crops.

The present invention provides N-aryl-carbamic acid thiolester compounds of the general formula

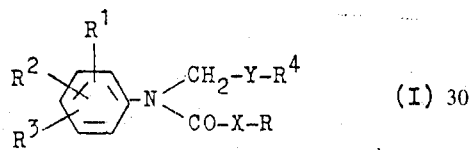 (I)

in which

R is an aliphatic hydrocarbyl radical optionally substituted with halo- or hydroxy, e.g., alkyl, alkenyl, hydroxyalkyl, hydroxyalkenyl, hydroxyalkynyl, haloalkyl, haloalkenyl, haloalkynyl or alkoxyalkyl, or aralkyl optionally substituted in the aryl moiety;

$R^1$, $R^2$, and $R^3$ represent hydrogen, alkyl, cycloalkyl, alkoxy, haloalkyl and/or halogen;

Furthermore $R_2$ and $R_3$ conjointly may represent a —(CH)$_4$—grouping to form a fused benzene ring with the adjacent atoms of the phenyl ring shown in the formula X is sulfur;

Z is oxygen or sulfur;

Y is oxygen, sulfur or a group of the formula

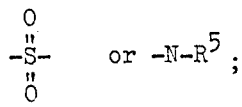

$R_4$ is an aliphatic hydrocarbyl radical optionally substituted with halo- or hydroxy, e.g., alkyl, alkenyl, alkynyl, optionally substituted cycloalkyl, cycloalkenyl, formyl, haloalkyl, haloalkenyl, haloalkynyl, alkoxyalkyl or alkylthioalkyl, alkoxycarbonylalkyl, alkylthiocarbonylalkyl, alkylcarbonylalkyl, or represents optionally substituted aryl, aralkyl, aroxyalkyl or arylthioalkyl; or, if Y is oxygen or sulphur, $R_4$ can be the group

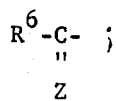

or, if Y is oxygen, $R_4$ can be the group

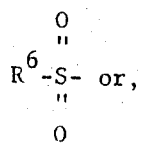

or, if Y is -N-$R^5$, $R^4$ can be, together with $R^5$, an alkylene bridge which, with the inclusion of amine nitrogen, forms a five-, six- or seven-membered heterocyclic ring which can contain further heteroatoms or heterogroups, $R^5$ is hydrogen, alkyl, alkenyl or optionally substituted aryl, and $R^6$ is the same as $R^4$ except that $R^6$ cannot be the groups

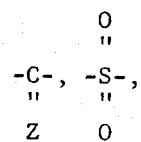

formyl and the alkylene bridge.

Surprisingly, the N-aryl-carbamic acid thiolesters according to the invention display a considerably higher herbicidal acitivity, with better toleration by crop plants, than the knoqn N-phenyl- and N-3-chlorophenyl-carbamic acid isopropyl esters, which are the chemically nearest substances of the same type of action. The substances according to the invention thus represent a valuable enrichment of the art.

Preferably, R is straight-chain or branched alkyl, hydroxyalkyl or haloalkyl, in each case of from 1 to 6 carbon atoms, and the latter with 1 to 3 fluorine or chlorine atoms, or R is alkenyl, hydroxyalkenyl or haloalkenyl, in each case with 2 to 6 carbon atoms, and the latter with 1 to 3 fluorine or chlorine atoms, or represents alkynyl, hydroxyalkynyl or haloalkynyl with, in each case, 3 to 6 carbon atoms, and the latter with 1 to 4 fluorine or chlorine atoms, or represents straight-chain or branched alkoxyalkyl with 1 to 4 carbon atoms in the alkoxy moiety and 1 to 6 carbon atoms in the alkyl moiety, or represents aralkyl with 1 to 4 carbon atoms in the alkyl moiety and 6 to 10 carbon atoms in the aryl moiety (which latter moiety may be substituted by halogen, branched or straight-chain alkyl with 1 to 4 carbon atoms, haloalkyl with 1 to 4 carbon atoms and 1 to 3 halogen atoms, and/or nitro) or represents cycloalkyl or cycloalkenyl with 5 to 8 carbon atoms; $R^1$, $R^2$ and $R^3$ which can be identical or different represent hydrogen, straight-chain or banched alkyl with 1 to 4 carbon atoms, cycloalkyl with 5 to 7 carbon atoms, haloalkyl with 1 or 2 carbon atoms and 2 to 5 chlorine or fluorine atoms, or fluorine, chlorine or bromine; $R^4$ represents straight-chain or branched alkyl with 1 to 18 carbon atoms, haloalkyl with 1 to 6 carbon atoms and with 1 to 3 fluorine or chlorine atoms, or represents straight-chain or branched alkenyl with 2 to 10 carbon atoms, haloalkenyl, with 2 to 6 carbon atoms and with 1 to 4 fluorine or chlorine atoms, or represents straight-chain or branched alkynyl or haloalkynyl, in each case with 3 to 6 carbon atoms, and the latter with 1 to 4 fluorine or chlorine atoms, or represents formyl, or represents alkoxyalkyl or alkylthioalkyl with 1 to 4 carbon atoms in the alkoxy or alkylthio moiethy and 2 to 4 carbon atoms in the alkyl moiety, or represents alkoxycarbonylalkyl or alkylthiocarbonylalkyl with 1 to 4 carbon atoms in the alkoxy or alkylthio moiety and 1 to 10 carbon atoms in the alkyl moiety or represents alkylcarbonylalkyl with 1 to 4 carbon atoms in the alkylcarbonyl moiety and 1 to 10 carbon atoms in the alkyl moiety, or represents optionally substituted cycloalkyl or cycloalkenyl with 5 to 8 carbon atoms, or represents aryl, aralkyl, aroxyalkyl or arylthioalkyl, in each case with 6 to 10 carbon atoms in the aryl moiety and 1 to 4 carbon atoms in any alkyl moiety (which aryl moiety can be substituted by fluorine, chlorine or bromine, or by straight-chain or branched alkyl with 1 to 3 carbon atoms, or by haloalkyl with 1 to 2 carbon atoms and 1 to 5 fluorine or chlorine atoms, or by straight-chain or branched alkoxy with 1 to 3 carbon atoms), or, if Y represents oxygen or sulphur, represents the group $R^6$—CO— or $R^6$—CS—, or, if Y represents oxygen represents the group $R^6$—$SO_2$ (wherein $R^6$ represents alkyl with up to 4 carbon atoms, haloalkyl with up to 4 carbon atoms and 1 or 2 halogen atoms, alkoxy with up to 3 carbon atoms or optionally substituted aryl or aralkyl with 6 carbon atoms in the aryl moiety and 1 or 2 carbon atoms in any alkyl moiety; Y represents oxygen, sulphur, sulphonyl or —N—$R^5$, wherein $R^5$ represents hydrogen, straight-chain or branched or alkyloralkenyl with up to 3 carbon atoms or phenyl optionally substituted by halogen, by alkyl with up to 3 carbon atoms, by alkoxy with up to 3 carbon atoms or by trifluoromethyl, or $R^5$ forms, together with $R^4$ and with the inclusion of the amine nitrogen and optionally further oxygen, nitrogen or sulphur hetero atoms, a five, six or seven membered heterocyclic ring linked by an alkylene bridge with 1 to 5 carbon atoms.

The preferred halogens are chlorine and fluorine.

The invention also provides a process for the preparation of a compound of the formula (I) in which a. a N-chloromethyl-N-aryl-carbamic acid ester or thiolester of the general formula

(II)

in which
R, $r^1$, $R^2$, $R^3$ and X have the abovementioned meanings is reacted with an alcohol, mercaptan, phenol, thiophenol, carboxylic acid, thiocarboxylic acid, sulphonic acid, sulphinic acid or amine of the general formula

H-Y-$R^4$ (III)

in which
$R^4$ and Y have the abovementioned meanings, in the presence of an acid-binding agent and optionally in the presence of a diluent, or (b) a N-chloromethyl-N-aryl-carbamic acid derivative of the formula (II) is reacted with a compound of the general formula

A—Y—$R^4$ (IV)

in which
$R^4$ and Y have the abovementioned meanings, and
A represents a cation, such as ammonium, alkylammonium, dialkylammonium or trialkylammonium or a cation from the group of the alkali metals or alkaline earth metals, optionally in the presence of a diluent.

If N-chloromethyl-N-(3-chlorophenyl)-thiocarbamic acid S-n-butyl ester and ethanol are used as the starting substances, the course of reaction in process variant (a) can be represented by the following formula scheme

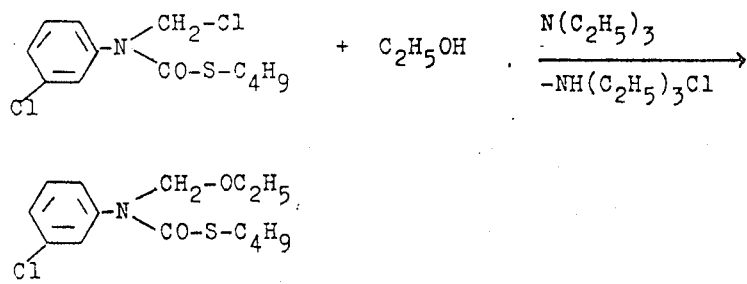

If N-chloromethyl-N-(3,4-dichlorophenyl)-thiocarbamic acid S-ethyl ester and the sodium salt of α,α-dichloropropionic acid are used as starting substances, the course of the reaction in process variant (b) can be represented by the following formula scheme

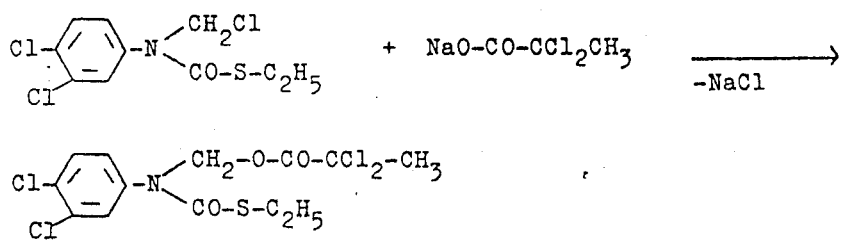

The N-chloromethyl-N-aryl carbamic acid esters and thiolesters used as starting substances are generally defined by the formula (II).

Examples of the N-chloromethyl-N-aryl-carbamic acid esters include N-chloromethyl-N-phenyl-thiocarbamic acid S-methyl ester, N-chloromethyl-N-phenyl-thiocarbamic acid S-ethyl ester, N-chloromethyl-N-phenyl-thiocarbanic acid S-propyl ester, N-chloromethyl-N-phenyl-thiocarbamic acid S-isopropyl ester, N-chloromethyl-N-phenyl-thiocarbamic acid S-butyl ester, N-chloromethyl-N-phenyl-thiocarbamic acid S-isobutyl ester, N-chloromethyl-N-phenyl-thiocarbamic acid S-(sec.)-butyl ester, N-chloromethyl-N-(3-chlorophenyl)-thiocarbamic acid S-methyl ester, N-chloromethyl-N-(3-chlorophenyl)-thiocarbamic acid S-ethyl ester, N-chloromethyl-N-(3-chlorophenyl)-thiocarbamic acid S-isopropyl ester, N-chloromethyl -N-(3-chlorophenyl)-thiocarbamic acid S-butyl ester, N-Chloromethyl-N-(3-chlorophenyl)-thiocarbamic acid S-isobutyl ester, N-chloromethyl-N-(3-chlorophenyl)-thiocarbamic acid S-(sec.)-butyl ester, N-chloromethyl-N-phenyl-carbamic acid isopropyl ester, N-chloromethyl-N-phenyl-carbamic acid (2-chloroethyl) ester, N-chloromethyl-N-phenyl-carbamic acid (4-chlorobutinyl) esters, N-chloromethyl-N-(3-chlorophenyl)-carbamic acid isopropyl ester, N-chloromethyl-N-(3-chlorophenyl)-carbamic acid (2-chlorethyl) ester, N-chloromethyl-N-(3-chlorophenyl)-carbamic acid (4-chlorobutinyl) ester, N-chloromethyl-N-(3,4-dichlorophenyl)-thiocarbamic acid S-ethyl ester, N-chloromethyl-N-(3,4-dichlorophenyl)-thiocarbamic acid S-butyl ester, N-chloromethyl-N-(2-methyl-5-chlorophenyl)-thiocarbamic acid S-ethyl ester, N-chloromethyl-N-(2-methyl-5-chlorophenyl)-thiocarbamic acid S-butyl ester, N-chloromethyl-N-(2-methyl-5-chlorophenyl)-carbamic acid isopropyl ester, N-chloromethyl-N-(2-methyl-5-chlorophenyl)-carbamic acid (2-chloroethyl)ester, N-chloromethyl-N-(2-methoxy-5-chlorophenyl)-thiocarbamic acid S-ethyl ester, N-chloromethyl-N-(2-methoxy-5-chlorophenyl)thiocarbamic acid S-butyl ester, N-chloromethyl-N-(2-methoxy-5-chlorophenyl)-carbamic acid isopropyl ester, N-chlorophenyl-N-(2-methoxy-5-chlorophenyl)-carbamic acid (2chloroethyl) ester, N-chloromethyl-N-(2,5-dichlorophenyl)-thiocarbamic acid S-ethyl ester, N-chloromethyl-N-(2,5-dichlorophenyl)-thiocarbamic acid S-butyl ester, N-chloromethyl-N-(2,5-dichlorophenyl)-carbamic acid isopropyl ester and N-chloromethyl-N-(2,5-dichlorophenyl)-carbamic acid (2-chloroethyl) ester.

The alcohols, mercaptans, phenols, thiophenols, carboxylic acids, thiocarboxylic acids, sulphonic acids, sulphinic acids, amines and their salts to be used as reactants are generally defined by the formulae (III) and (IV).

A in the formula (IV) represents a cation, such as ammonium, alkylammonium, dialkylammonium or trialkylammonium with 1 to 4 carbon atoms in the straight-chain or branched alkyl radical, or an alkali metal cation, such as a sodium or potassium ion, or an alkaline earth metal cation, such as a magnesium or calcium ion.

As examples of the alcohols, mercaptans, phenols, thiophenols, carboxylic acids, thiocarboxylic acids, sulphonic acids, sulphinic acids, amines and their salts which can be used according to the invention, the following may be mentioned indvidually: methanol, ethanol, propanol, isopropanol, tert.-butanol allyl alcohol, propargyl alcohol, 3-methylbutin-3-ol, buten-3-ol, 2-chloroethanol, 4-chloro-2-butinol, cyclohexanol, glycol monomethyl ether, benzyl alcohol, 2,4-dichlorophenol, 4-chlorpenol, methylmercaptan, ethylmercaptan, propylmercaptan, isopropylmercaptan, allylmercaptan, benzylmercaptan, 4-chloreothiophenol, sodium acetate, sodium monochloroacetate, sodium dichloroacetate, sodium 2,2-dichloropropionate, sodium phenylacetate, sodium benzoate, potassium lactate, potassium xanthate, sodium thioacetate, sodium butyrate, sodium valerate, sodium propionte, sodium isobutyrate, sodium trifluoroacetate, sodium crotonate and formic acid. The alcohols, mercaptans, phenols, thiophenols, carboxylic acids, thiocarboxylic acids, sulphonic acids, sulphinic acids, amines and their salts of the formulae (III) and (IV) are known.

Suitable diluents in the reaction of process variant (a) include the inert organic solvents. These preferably include hydrocarbons such as benzine, benzene, and toluene; halogenated hydrocarbons, such as dichloromethane, chloroform and carbon tetrachloride; and ethers, such as diethyl ether, dioxan or tetrahydrofuran.

As acid-binding agents, it is possible to use all customary acid-binding agents. These preferably include alkali metal hydroxides, alkali metal carbonates and tertiary organic bases. The following may be mentioned individually as being particularly suitable: sodium carbonate, triethylamine and pyridine.

The reaction temperatures can be varied over a wide range. In general, the reaction is carried out at from −20°C to +100°C, preferably -10°C to +80°C.

In carrying out the process according to variant (a), each mol of N-chloromethyl-N-aryl-carbamic acid ester of the formula (II) is normally treated with 1 to 2 mols of the compounds of the formula (III) and 1 to 2 mols of an acid-binding agent. Going further beyond the stoichiometric ratios does not seem to result in any significant improvement in yield.

In order to isolate the compounds of the formula (I), the hydrochloride produced may be removed by filtering off and subsequent thorough washing the reaction solution with water, and the solution may be dried over freshly calcined sodium sulphate and subsequently distilled. To compounds of the formula (I) are in most cases water-clear liquids which can easily be distilled. IN some cases, however, oils which cannot be distilled are obtained.

Suitable diluents for the reaction of process varient (b) include the polar organic solvents. These preferably include nitriles, such as acetonitirle and tolunitrile, sulphoxides such as dimethylsulphoxide, and amides such as dimethylformamide.

The reaction temperatures can also be varied over a major range in this variant. In general, the reaction is carried out at from 0°C to 150°C, preferably 20°C to 100°C.

In carrying out the process according to variant (b), 1 to 2 mols of the compounds of the formula (IV) are normally employed for each mol of the compounds of the formula (I).

To isolate the compounds of the formula (I), the chloride produced may be filtered off, the filtrate evaporated to dryness and the residue taken up in an organic solvent. After brief shaking with water, the organic phase may be dried and thereafter the solvent may be distilled off in vacuo. The product thus obtained is in many cases pure and can, if necessary, be purified further by distillation.

The following examples are illustrative of the preparation of the instant compounds.

Example 1

Preparation of N-methoxymethyl-N-(3-chlorophenyl)-thiocarbamic acid S-ethyl ester

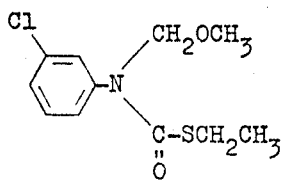

(Compound 1)

A mixture of 13.6 g (0.424 mol) of methanol and 21.4 g (0.212 mol) of triethylamine in 120 ml of anhydrous benzene is slowly added dropwise at 20°C, whilst stirring and cooling with ice, to a solution of 56 g (0.212 mol) of N-chloromethyl-N-(3-chlorophenyl)-thiocarbamic acid S-ethyl ester in 150 ml of anhydrous benzene. Therafter the mixture is stirred for 1 hour at 25°C, the resulting triethylamine hydrochloride is filtered off, the benzene solution is washed with water and dried over freshly calcined sodium sulphate, the solvent is distilled off and the crude carbamic acid ester is distilled in vacuo. 49.5 g (90% of theory) of N-methoxymethyl-N-(3-chlorophenyl)-thiocarbamic acid S-ethyl ester of boiling point 134°C/0.4 mm Hg are obtained.

Example 2

Preparation of N-ethyoxythio-carbonylthiomethyl-N-phenyl-carbamic acid methyl ester

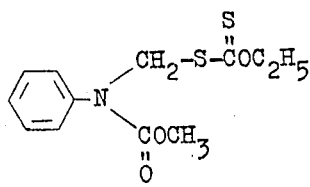

(Compound 2)

A solution of 20.0 g (0.10 mol) of N-chloromethyl-N-phenyl-carbamic acid methyl ester in 100 ml of dry acetonitrile is added dropwise over the course of 20 minutes, whilst stirring, to a suspension of 24.0 g (0.15 mol) of potassium ethyl-xanthate in 250 ml of dry acetonitrile. In the course thereof, the temperature of the reaction mixture rises to 30°C The potassium chloride which has separated out is filtered off, the solvent is distilled off under reduced pressure, the residue is taken up in benzene and the benzene phase is washed with water and dried over calcined sodium sulphate. After distilling off the solvent, the residual solvent is removed by warming the liquid residue for one hour at 80°C and 0.3 mm Hg. The N-ethoxythio-carbonylthiomethyl-N-phenyl-carbamic acid methyl ester which remains cannot be distilled without decomposition. 4.05 g (95% of theory) of carbamic acid ester of refractive index $n_d^{20}$ =1.5848 are obtained.

Example 3

Preparation of N-morpholino-methyl-N-(3,4-dichlorophenyl)-carbamic acid methyl ester

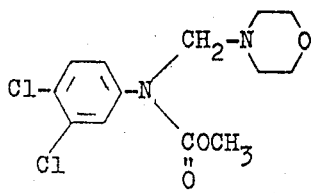

(Compound 3)

34.9 g (0.4 mol) of morpholine dissolved in 50 ml of benzene are added dropwise over the course of 30 minutes, with vigorous stirring, to a solution of 53.6 g (0.2 mol) of N-chloromethyl-N-(3,4-dichlorophenyl)-carbamic acid methyl ester in 350 ml of dry benzene. Thereupon, the temperature of the reaction mixture rises to 60°C. Thereafter the morpholine hydrochloride which has separated out is filtered off, the filtrate is washed with water and the benzene solution is dried over calcined sodium sulphate and evaporated. The N-morpholino-methyl-N-(3,4-dichlorophenyl)-carbamic acid methyl ester thus obtained (57.5 g/90% of theory) melts at 87°–89°C after recrystallisation from isopropanol.

Exampel 4

Preparation of N-(4-chlorophenyl-sulphonyl)-methyl-N-phenyl carbamic acid methyl ester

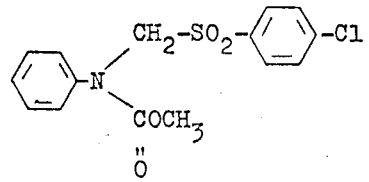

(Compound 4)

A solution of 22.0 g (0.11 mol) of N-chloromethyl-N-phenyl-carbamic acid methyl ester in 50 ml of acetonitrile is addded dropwise over the cours of course minutes to a suspension of 35.2 g (0.177 mol) of sodium p-chlorobenzenesulphinate in 250 ml of dry acetonitrile. After filtering off the salts, the mixture is evaporated to dryness, the residue is taken up in 300 ml of benzene, the benzene solution is washed with water and dried over calcined sodium sulphate and the solvent is distilled off under reduced pressure. N-(4-chlorophenyl-sulphonyl)-methyl-N-phenyl-carbamic acid methyl ester (52.5 g/87% of theory) is thus obtained, melting at 137°–1380°C after recrystallisation from ethanol.

The compounds listed in Tables 1 to 4 below were obtained analogously. While the compounds are listed in Table 1 to 4 by giving the structures thereof, certain compounds listed therein are named in Table 5, to provide a convenient correlation of structures and chemical names.

Table 1

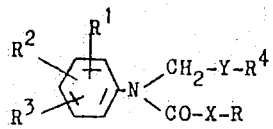

| Compound and Example Number | R | X | $R^1$ | $R^2$ | $R^3$ | Y | $R^4$ | $R^5$ | Melting Point [°C] Boiling Point [°C/mm Hg] Refractive Index $[n_D^{20}]$ |
|---|---|---|---|---|---|---|---|---|---|
| 5 | $CH_3$ | O | H | H | H | O | $CH_3$ | | 86-87/0.3 |
| 6 | $CH_3$ | O | H | H | H | O | $C_2H_5$ | | 104/0.35 |
| 7 | $CH_3$ | O | H | H | H | O | $(CH_3)_2CH$ | | 79-81/0.15 |
| 8 | $CH_3$ | O | H | H | H | O | $C_4H_9$ | | 93-94/0.15 |
| 9 | $(CH_3)_2CH$ | O | H | H | H | O | $CH_3$ | | 98/0.4 |
| 10 | $(CH_3)_2CH$ | O | H | H | H | O | $C_2H_5$ | | 92/0.3 |
| 11 | $(CH_3)_2CH$ | O | H | H | H | O | $C_3H_7$ | | 128-130/0.8 |
| 12 | $(CH_3)_2CH$ | O | H | H | H | O | $(CH_3)_2CH$ | | 94/0.2 |
| 13 | $(CH_3)_2CH$ | O | 3-Cl | H | H | O | $CH_3$ | | 110/0.2 |
| 14 | $(CH_3)_2CH$ | O | 3-Cl | H | H | O | $C_2H_5$ | | 131-133/0.5 |
| 15 | $(CH_3)_2CH$ | O | 3-Cl | H | H | O | $C_3H_7$ | | 139-141/0.5 |
| 16 | $(CH_3)_2CH$ | O | 3-Cl | H | H | O | $(CH_3)_2CH$ | | 133-135/0.5 |
| 17 | $(CH_3)_2CH$ | O | 3-Cl | H | H | O | $C_4H_9$ | | 146-148/0.5 |
| 18 | $(CH_3)_2CH$ | O | 3-Cl | H | H | O | $CH\equiv C-CH_2$ | | 135-140/0.3 |
| 19 | $(CH_3)_2CH$ | O | 3-Cl | H | H | O | $(C_2H_5)(CH_3)CH$ | | 135-137/0.4 |
| 20 | $(CH_3)_2CH$ | O | 3-Cl | H | H | O | $(CH_3)_3C$ | | 130-132/0.3 |
| 21 | $(CH_3)_2CH$ | O | 3-Cl | H | H | O | $CH_2=CH-C(CH_3)_2$ | | 139-141/0.3 |
| 22 | $(CH_3)_2CH$ | O | 3-Cl | H | H | O | $CH\equiv C-C(CH_3)_2$ | | 140-145/0.4 |
| 23 | $(CH_3)_2CH$ | O | 3-Cl | H | H | S | $C_4H_9$ | | 161/0.7 |
| 24 | $(CH_3)_2CH$ | O | 3-Cl | H | H | S | $(C_2H_5)(CH_3)CH$ | | 144/0.7 |
| 25 | $(CH_3)_2CH$ | O | 3-Cl | H | H | S | $(CH_3)_2CH-CH_2$ | | 148/0.7 |
| 26 | $ClCH_2CH_2$ | O | 3-Cl | H | H | O | $CH_3$ | | 1.5380 |
| 27 | $ClCH_2CH_2$ | O | 3-Cl | H | H | O | $C_2H_5$ | | 1.5325 |
| 28 | $ClCH_2CH_2$ | O | 3-Cl | H | H | O | $C_3H_7$ | | 1.5276 |

Table 1 - continuation $$\begin{array}{c} R^1 \\ R^2 \diagdown \diagup \\ R^3 \diagup \diagdown N \diagup CH_2-Y-R^4 \\ \diagdown CO-X-R \end{array}$$

| Example Number | R | X | $R^1$ | $R^2$ | $R^3$ | Y | $R^4$ | $R^5$ | Melting Point [°C] Boiling Point [°C/mm Hg] Refractive Index [$n_D^{20}$] |
|---|---|---|---|---|---|---|---|---|---|
| 29 | ClCH$_2$CH$_2$ | O | 3-Cl | H | H | O | (CH$_3$)$_2$CH | | 1,5282 |
| 30 | ClCH$_2$CH$_2$ | O | 3-Cl | H | H | O | C$_4$H$_9$ | | 1,5239 |
| 31 | ClCH$_2$CH$_2$ | O | 3-Cl | H | H | O | (C$_2$H$_5$)(CH$_3$)CH | | 1,5274 |
| 32 | ClCH$_2$CH$_2$ | O | 3-Cl | H | H | S | C$_3$H$_7$ | | 1,5548 |
| 33 | ClCH$_2$CH$_2$ | O | 3-Cl | H | H | S | C$_4$H$_9$ | | 1,5496 |
| 34 | CH$_3$ | O | 3-Cl | H | H | O | CH$_3$ | | 96-98/0,25 |
| 35 | CH$_3$ | O | 3-Cl | H | H | O | (CH$_3$)$_2$CH | | 96-97/0,15 |
| 36 | CH$_3$ | O | 3-Cl | H | H | O | C$_4$H$_9$ | | 125-126/0,5 |
| 37 | CH$_3$ | O | H | 4-Cl | H | O | CH$_3$ | | 113/0,4 |
| 38 | CH$_3$ | O | H | 4-Cl | H | O | (CH$_3$)$_2$CH | | 111/0,25 |
| 39 | CH$_3$ | O | H | 4-Cl | H | O | C$_4$H$_9$ | | 118-119/0,25 |
| 40 | CH$_3$ | O | 3-Cl | 4-Cl | H | O | CH$_3$ | | 154-155/1,5 |
| 41 | CH$_3$ | O | 3-Cl | 4-Cl | H | O | C$_2$H$_5$ | | 136/0,35 |
| 42 | CH$_3$ | O | 3-Cl | 4-Cl | H | O | (CH$_3$)$_2$CH | | 122-123/0,25 |
| 43 | CH$_3$ | O | 3-Cl | 4-Cl | H | O | C$_4$H$_9$ | | 166-167/1,3 |
| 44 | CH$_3$ | O | H | H | H | O | 2,4Cl$_2$-C$_6$H$_3$ | | 72-72,5 |
| 45 | CH$_3$ | O | H | H | H | S | C$_4$H$_9$ | | 124-126/0,65 |
| 46 | CH$_3$ | O | H | H | H | S | 4-Cl-C$_6$H$_4$ | | 171-175/0,15 |
| 47 | (CH$_3$)$_2$CH | O | 2-CH$_3$ | H | 5-Cl | O | CH$_3$ | | 132/0,6 |
| 48 | (CH$_3$)$_2$CH | O | 2-CH$_3$ | H | 5-Cl | O | C$_2$H$_5$ | | 130/0,2 |
| 49 | (CH$_3$)$_2$CH | O | 2-CH$_3$O | H | 5-Cl | O | CH$_3$ | | 138/0,2 |
| 50 | (CH$_3$)$_2$CH | O | 2-CH$_3$O | H | 5-Cl | O | C$_2$H$_5$ | | 138/0,3 |
| 51 | CH$_3$ | O | H | H | H | | 2,4-Cl$_2$-C$_6$H$_3$-NH | | 109-112 |
| 52 | CH$_3$ | O | H | H | H | | N⌬O | | 93-95 |
| 53 | ClCH$_2$CH$_2$ | O | 3-Cl | H | H | | N⌬O | | 1,5458 |

Table 1 - continuation

Structure:

$$R^2\underset{R^3}{\overset{R^1}{\diagdown}}\!\!\!\!\!\bigcirc\!\!\!\!\!-N\!\!\begin{array}{c}CH_2-Y-R^4\\CO-X-R\end{array}$$

| Example Number | R | X | R¹ | R² | R³ | Y | R⁴ | R⁵ | Melting Point [°C] / Boiling Point [°C/mm Hg] / Refractive Index [$n_D^{20}$] |
|---|---|---|---|---|---|---|---|---|---|
| 54 | ClCH₂CH₂ | O | 3-Cl | H | H | N⎯⎯⎯NH | | | 1.5420 |
| 55 | CH₃ | O | 3-Cl | H | H | SO₂ | 3-Cl-C₆H₄ | | 123-125 |
| 56 | C₄H₉ | S | 3-Cl | H | H | O | C₂H₅ | | 1.5494 |
| 57 | C₄H₉ | S | 3-Cl | H | H | O | C₃H₇ | | 1.5438 |
| 58 | C₄H₉ | S | 3-Cl | H | H | O | (CH₃)₂CH | | 1.5473 |
| 59 | C₄H₉ | S | 3-Cl | H | H | O | C₄H₉ | | 1.5381 |
| 60 | C₂H₅ | S | 3-Cl | 4-Cl | H | O | CH₃ | | 158/0.1 |
| 61 | C₂H₅ | S | 3-Cl | H | H | O | C₂H₅ | | 130/0.5 |
| 62 | C₂H₅ | S | 3-Cl | H | H | O | (CH₃)₂CH | | 134/0.25 |
| 63 | C₂H₅ | S | 3-Cl | H | H | O | C₄H₉ | | 156/0.6 |

Table 2

$$R^6-\underset{Z}{\overset{}{C}}-Y-CH_2-N-CO-X-R$$

with phenyl bearing $R^1$, $R^2$, $R^3$

| Example Number | R | X | R¹ | R² | R³ | Y | Z | R⁶ | Melting Point [°C] / Boiling Point [°C/mm Hg] / Refractive Index [$n_D^{20}$] |
|---|---|---|---|---|---|---|---|---|---|
| 64 | (CH₃)₂CH | O | H | H | H | O | O | (CH₃)₂CH | 122/0.3 |
| 65 | (CH₃)₂CH | O | H | H | H | O | O | (CH₃)₃C | 138/0.7 |
| 66 | (CH₃)₂CH | O | H | H | H | O | O | C₆H₅-CH₂ | 179-180/0.5 |
| 67 | (CH₃)₂CH | O | H | H | H | O | O | C₆H₅ | 64-65 |
| 68 | (CH₃)₂CH | O | H | H | H | O | O | CH₃ | 118/0.4 |
| 69 | (CH₃)₂CH | O | H | H | H | O | O | C₂H₅ | 119/0.2 |
| 70 | (CH₃)₂CH | O | 3-Cl | H | H | O | O | C₂H₅ | 138/0.4 |
| 71 | (CH₃)₂CH | O | 3-Cl | H | H | O | O | C₃H₇ | 150/0.4 |

Table 3

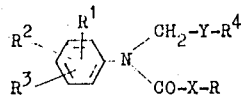

| Example Number | R | X | R¹ | R² | R³ | Y | R⁴ | Boiling Point (°C/mm Hg) |
|---|---|---|---|---|---|---|---|---|
| 88 | $HC \equiv C-CH(CH_3)$ | O | 3-Cl | H | H | O | $CH_3$ | 136-137/0.3 |
| 89 | $HC \equiv C-CH(CH_3)$ | O | 3-Cl | H | H | O | $C_2H_5$ | 140-141/0.4 |
| 90 | $HC \equiv C-CH(CH_3)$ | O | 3-Cl | H | H | O | $n-C_3H_7$ | 140-142/0.2 |
| 91 | $HC \equiv C-CH(CH_3)$ | O | 3-Cl | H | H | O | $(CH_3)_2CH$ | 142-143/0.5 |
| 92 | $HC \equiv C-CH(CH_3)$ | O | 3-Cl | H | H | O | $(CH_3)_2CH-CH_2$ | 148-149/0.4 |
| 93 | $HC \equiv C-C(CH_3)_2$ | O | 3-Cl | H | H | O | $CH_3$ | 132-134/0.1 |
| 94 | $HC \equiv C-C(CH_3)_2$ | O | 3-Cl | H | H | O | $(CH_3)_2CH$ | 140-141/0.6 |

Table 4

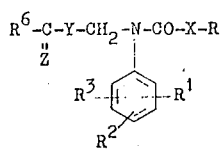

| Example Number | R | X | R¹ | R² | R³ | Y | Z | R⁶ | Melting Point °C / Boiling Point °C/mm Hg / Refractive index $n_D^{20}$ |
|---|---|---|---|---|---|---|---|---|---|
| 95 | $C_2H_5$ | S | 3-Cl | 4-Cl | H | O | O | $CH_2Cl$ | 1.5769 |
| 96 | $C_2H_5$ | S | 3-Cl | 4-Cl | H | O | O | $CH_3$ | 1.5768 |
| 97 | $(CH_3)_2CH$ | O | 3-Cl | H | H | O | O | $CH_2Cl$ | 72.5 |
| 98 | $(CH_3)_2CH$ | O | 3-Cl | H | H | O | O | $CCl_2CH_3$ | 1.5167 |
| 99 | $(CH_3)_2CHCH_2$ | O | 3-Cl | H | H | O | O | $CH_3$ | 153/0.1 |
| 100 | $(CH_3)_2CHCH_2$ | O | 3-Cl | H | H | O | O | $C_2H_5$ | 151/0.1 |
| 101 | $(CH_3)_2CHCH_2$ | O | 3-Cl | H | H | O | O | $n-C_3H_7$ | 159/0.1 |
| 102 | $(CH_3)_2CHCH_2$ | O | 3-Cl | H | H | O | O | $cyclo-C_3H_5$ | 168/0.1 |
| 103 | $(CH_3)_2CHCH_2$ | O | 3-Cl | H | H | O | O | $(CH_3)_3C$ | 161/0.1 |
| 104 | $C_2H_5-CH-CH_3$ | O | 3-Cl | H | H | O | O | $CH_3$ | 145/0.08 |
| 105 | $C_2H_5-CH-CH_3$ | O | 3-Cl | H | H | O | O | $C_2H_5$ | 150/0.1 |
| 106 | $C_2H_5-CH-CH_3$ | O | 3-Cl | H | H | O | O | $n-C_3H_7$ | 156/0.05 |
| 107 | $C_2H_5-CH-CH_3$ | O | 3-Cl | H | H | O | O | $n-C_4H_9$ | 160/0.1 |
| 108 | $C_2H_5-CH-CH_3$ | O | 3-Cl | H | H | O | O | $(CH_3)_3C$ | 153/0.1 |
| 109 | $ClCH_2CH_2$ | O | 3-Cl | H | H | O | O | $Cl-C_6H_3(Cl)-O-CH_2$ | 80-82 |
| 110 | $ClCH_2CH_2$ | O | 3-Cl | H | H | O | O | $C_2H_5$ | 190/1.2 |
| 111 | $ClCH_2CH_2$ | O | 3-Cl | H | H | O | O | $C_3H_7$ | 168/0.6 |
| 112 | $ClCH_2CH_2$ | O | 3-Cl | H | H | O | O | $(CH_3)_2CH$ | 170/0.6 |
| 113 | $ClCH_2CH_2$ | O | 3-Cl | H | H | O | O | $Cl-C_6H_4-$ | 92-93 |
| 114 | $(CH_3)_2CH$ | O | H | H | H | O | O | $(C_2H_5)_2CH$ | 134/0.3 |
| 115 | $(CH_3)_2CH$ | O | H | H | H | O | O | $C_3H_7$ | 128/0.3 |
| 116 | $(CH_3)_2CH$ | O | H | H | H | O | O | $CH_3-CH(Cl)$ | 138/0.4 |
| 117 | $(CH_3)_2CH$ | O | H | H | H | O | O | $ClCH_2$ | 139/0.3 |

Table 4 - continuation

| Example Number | R | X | R¹ | R² | R³ | Y | Z | R⁶ | Melting Point °C / Boiling Point °C/mm Hg / Refractive index $n_D^{20}$ |
|---|---|---|---|---|---|---|---|---|---|
| 118 | (CH₃)₂CH | O | H | H | H | O | O | $C_2H_5-\underset{CH_3}{CH}-$ | $n_D^{20}$ 1.4888 |
| 119 | (CH₃)₂CH | O | H | H | H | O | O | C₄H₉ | $n_D^{20}$ 1.4892 |
| 120 | (CH₃)₂CH | O | H | H | H | O | O | (CH₃)₂CH-CH₂ | $n_D^{20}$ 1.4868 |
| 121 | (CH₃)₂CH | O | H | H | H | O | O | C₆H₅- | $n_D^{20}$ 1.5060 |
| 122 | (CH₃)₂CH | O | H | H | H | O | O | C₆H₁₁- | 64-65 |
| 123 | (CH₃)₂CH | O | H | H | H | O | O | $(CH_3)_3C-\underset{Cl}{CH}-$ | $n_D^{20}$ 1.5004 |
| 124 | (CH₃)₂CH | O | H | H | H | O | O | CH₃-CO-CH₂-CH₂ | 71-72 |
| 125 | (CH₃)₂CH | O | H | H | H | O | O | CH₃-(CH₂)₁₂- | 37-38 |
| 126 | (CH₃)₂CH | O | H | H | H | O | O | CH₃-(CH₂)₁₄- | 43-44 |
| 127 | (CH₃)₂CH | O | H | H | H | O | O | CH₃-CH=CH- | 52-53 |
| 128 | (CH₃)₂CH | O | H | H | H | O | O | $C_4H_9-\underset{C_2H_5}{CH}-$ | $n_D^{20}$ 1.4845 |
| 129 | (CH₃)₂CH | O | H | H | H | O | O | CH₃-(CH₂)₁₀- | $n_D^{20}$ 1.4829 |
| 130 | (CH₃)₂CH | O | H | H | H | O | O | ClCH₂CH₂- | 142-144/0.4 |
| 131 | (CH₃)₂CH | O | H | H | H | O | O | Cl₂CH | 162-163/0.7 |
| 132 | (CH₃)₂CH | O | H | H | H | O | O | CH₃O-CO-CH₂-CH₂- | 39-41 |
| 133 | (CH₃)₂CH | O | H | H | H | O | O | $CH_2=\underset{CH_3}{C}-$ | 136/0.4 |
| 134 | (CH₃)₂CH | O | H | H | H | O | O | CH₂=CH-(CH₂)₈- | $n_D^{20}$ 1.4899 |
| 135 | (CH₃)₂CH | O | H | H | H | O | O | CH₂=CH- | 161/2.5 |
| 136 | (CH₃)₂CH | O | H | H | H | O | O | (CH₃)₃C-C₆H₄- | $n_D^{20}$ 1.5331 |
| 137 | (CH₃)₂CH | O | H | H | H | O | O | CH₃-(CH₂)₁₆- | 35-37 |
| 138 | (CH₃)₂CH | O | H | H | H | O | O | $Cl-C_6H_4-\underset{CH_3}{CH}-\underset{Cl}{CH}-$ | $n_D^{20}$ 1.5414 |
| 139 | (CH₃)₂CH | O | H | H | H | O | O | (hexahydrophthalide with methylcyclohexyl substituent) | 99-100 |
| 140 | HC≡C-CH(CH₃) | O | 3-Cl | H | H | O | O | CH₃ | 153-155/0.2 |
| 141 | HC≡C-CH(CH₃) | O | 3-Cl | H | H | O | O | ClCH₂ | 137-139/10⁻³ |
| 142 | HC≡C-CH(CH₃) | O | 3-Cl | H | H | O | O | C₂H₅ | 155-156/0.2 |
| 143 | HC≡C-CH(CH₃) | O | 3-Cl | H | H | O | O | C₃H₇ | 158-160/0.1 |
| 144 | HC≡C-CH(CH₃) | O | 3-Cl | H | H | O | O | (CH₃)₂CH | 154-155/0.2 |
| 145 | HC≡C-CH(CH₃) | O | 3-Cl | H | H | O | O | C₄H₉ | 163-165/0.2 |
| 146 | HC≡C-C(CH₃)₂ | O | 3-Cl | H | H | O | O | CH₃ | 160-162/0.2 |
| 147 | HC≡C-C(CH₃)₂ | O | 3-Cl | H | H | O | O | C₂H₅ | 162-163/0.1 |

Table 5

| Compound No. | Structure | Chemical Name |
|---|---|---|
| 9 | C₆H₅–N(CH₂–OCH₃)(CO–OC₃H₇-i) | N-methoxymethyl-N-phenyl-carbamic acid isopropyl ester |
| 14 | C₆H₅–N(CH₂–OC₂H₅)(CO–OC₃H₇-i) | N-ethoxymethyl-N-(3-chlorophenyl)-carbamic acid isopropyl ester |
| 18 | (Cl)C₆H₄–N(CH₂–O–CH₂–C≡CH)(CO–OC₃H₇-i) | N-propargyloxymethyl-N-(3-chloro-phenyl)-carbamic acid isopropyl ester |
| 27 | (Cl)C₆H₄–N(CH₂–OC₂H₅)(CO–OCH₂CH₂-Cl) | N-ethoxymethyl-N-(3-chlorophenyl)-carbamic acid 2-chloroethyl ester |
| 33 | (Cl)C₆H₄–N(CH₂–SC₄H₉-n)(CO–OCH₂CH₂-Cl) | N-n-butylthiomethyl-N-(3-chlorphenyl)-carbamic acid 2-chloroethyl ester |
| 42 | (Cl,Cl)C₆H₃–N(CH₂–OC₃H₇-i)(CO–OCH₃) | N-isopropoxymethyl-N-(3,4-dichlorophenyl)-carbamic acid methyl ester |
| 44 | C₆H₅–N(CH₂–O–C₆H₃(Cl)(Cl))(CO–OCH₃) | N-(2,4-dichlorophenoxy)-methyl-N-phenyl-carbamic acid methyl ester |
| 47 | (CH₃, Cl)C₆H₃–N(CH₂–OCH₃)(CO–OCH₃H₇-i) | N-methoxymethyl-N-(2-methyl-5-chloro-phenyl)-carbamic acid isopropyl ester |
| 51 | C₆H₅–N(CH₂–NH–C₆H₃(Cl)(Cl))(CO–OCH₃) | N-(2,4-dichlorophenylamino)-methyl-N-phenyl-carbamic acid methyl ester |
| 52 | C₆H₅–N(CH₂–morpholino)(CO–OCH₃) | N-(1)-morpholinomethyl-N-phenyl-carbamic acid methyl ester |
| 54 | (Cl)C₆H₄–N(CH₂–piperazino-NH)(CO–OCH₂CH₂-Cl) | N-(1)-piperazinomethyl-N-(3-chloro-phenyl)-carbamic acid 2-chloroethyl ester |
| 55 | (Cl)C₆H₄–N(CH₂–SO₂–C₆H₄Cl)(CO–OCH₃) | N-(3-chlorophenylsulfonyl)-methyl-N-(3-chlorophenyl)-carbamic acid methyl ester |
| 56 | (Cl)C₆H₄–N(CH₂–OC₂H₅)(CO–SC₄H₉-n) | N-ethoxymethyl-N-(3-chlorophenyl)-thiolcarbamic acid S-n-butyl ester |

Table 5 - cont'd.

| Compound No. | Structure | Chemical Name |
|---|---|---|
| 60 | Cl-C₆H₃(Cl)-N(CH₂-OCH₃)(CO-SC₂H₅) | N-methoxymethyl-N-(3,4-dichloro-phenyl)-thiolcarbamic acid ethyl ester |
| 66 | C₆H₅-N(CH₂-O-CO-CH₂-C₆H₅)(CO-OC₃H₇-i) | N-(benzylcarbonyloxy)-methyl-N-phenyl carbamic acid isopropyl ester |
| 75 | Cl-C₆H₄-N(CH₂-O-CO-C(CH₃)₃)(CO-OC₃H₇-i) | N-(tert. butylcarbonyloxy)-methyl-N-(3-chlorophenyl)-carbamic acid isopropyl ester |
| 79 | Cl-C₆H₄-N(CH₂-O-CO-CCl₂CH₃)(CO-OC₃H₇-i) | N-(2,2-dichloropropionyloxy)-methyl-N-(3-chlorophenyl)-carbamic acid isopropyl ester |
| 82 | Cl-C₆H₃(OCH₃)-N(CH₂-O-CO-CH₃)(CO-OC₃H₇-i) | N-acetoxymethyl-N-(2-methoxy-5-chlorophenyl) carbamic acid isopropyl ester |
| 86 | Cl-C₆H₃(Cl)-N(CH₂-O-CO-CCl₂CH₃)(CO-SC₂H₅) | N-(2,2-dichloropropionyloxy)-methyl-N-(3,4-dichlorophenyl)-thiolcarbamic acid ethyl ester |
| 88 | Cl-C₆H₄-N(CH₂-OCH₃)(CO-O-CH(CH₃)-C≡CH) | N-methoxymethyl-N-(3-chlorophenyl)-carbamic acid but-(1)-in-(3)-yl ester |
| 102 | Cl-C₆H₄-N(CH₂-O-CO-cyclopropyl)(CO-OC₄H₉-i) | N-(cyclopropylcarbonyloxy)-methyl-N-(3-chlorophenyl)-carbamic acid isobutyl ester |
| 109 | Cl-C₆H₄-N(CH₂-O-CO-CH₂-O-C₆H₃(Cl)Cl)(CO-OCH₂CH₂-Cl) | N-(2,4-dichlorophenoxymethylene-carbonyloxy)-methyl-N-(3-chlorophenyl)-carbamic acid 2-chloroethyl ester |
| 116 | C₆H₅-N(CH₂-O-CO-CH(Cl)-CH₃)(CO-OC₃H₇-i) | N-(2-chloropropionyloxy)-methyl-N-phenyl-carbamic acid isopropyl ester |
| 136 | C₆H₅-N(CH₂-O-CO-C₆H₄-C(CH₃)₃)(CO-OC₃H₇-i) | N-(4-tert. butyl-benzoyloxy)-methyl-N-phenyl-carbamic acid isopropyl ester |

The active compounds according to the invention have a very strong influence on plate growth, but in various ways, so that they can be used as selective herbicides. At higher concentrations (for example over 25 kg/ha) the active compounds according to the invention are also suitable as total herbicides.

Weeds, in the broadest sense, are plants which grow in locations where they are not desired. As weeds there may be mentioned dicotylidons such as mustard (Sinapis), cress (Lepidium), cleavers (Galium), chickweed (Stellaria), chamomile (Matricaria), gallant solider (Galinsoga), goosefoot (Chenopodium), annual nettle (Urtica), and groundsel (Senecio), and monocotyledons such as timothy (Phleum), bluegrass (Poa), fescue (Festuca), goosegrass (Eleusine), foxtail (Setaria), ryegrass (Lolium) and barnyard grass (Echinochloa).

The active compounds according to the present invention can be converted into the usual formulations, such as solutions, emulsions, suspensions, powders, pastes and granulates. these may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromtic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates, Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl suphonates, alkyl sulphates and aryl sulphonates; and preferred examples of dispersing agents include lignin, sulphite waste liquors and methyl cellulose.

The active compounds according to the invention may be used mixed with other active compounds.

The formulations contain, in general, from 0.1 to 95, per cent by weight of active compound.

The active compounds can be employed as such or in the form of their formulations or ready-to-apply forms prepared therefrom, such as ready-to-use solutions, emulsions, suspensions, powders, pastes and granules. They may be employed in the usual manner, for example by watering, spraying, atomising, sprinkling and dusting.

They can be applied both by the post-emergence method and by the pre-emergence method; they are preferably employed before emergence of the plants.

For actual application the compositions may be diluted. The amount of active compound employed can vary within substantial ranges. It depends essentially on the nature of the desired effect. In general, the amounts applied to an area of crop cultivation are from 0.1 to 25 kg/ha, preferably 0.5 to 20 kg/ha.

The active compounds according to the invention can also be employed as plant growth regulators. They furthermore posses insecticidal and acaricidal activity. Some of them additonally display a fungitoxic activity.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or their habitat a compound according to the invention alone or in the form of a composition containing as active ingredient a compound according to the invention in admixture with a diluent or carrier.

The invention also provides crops protected from damage by weeds be being grown in areas in which, immediately prior to and/or during the time of the growing, a compound according to the invention was applied alone or in admixture with a diluent or carrier. It will be seen that the usual methods of providing a harvested crop may be improved by the present invention. The invention is illustrated by the following Examples.

EXAMPLE A

Pre-emergence test
Solvent: 5 parts by weight of acetone
Emulsifier: 1 parts by weight of alkylaryl polyglycol ether To produce a suitable preparation of active compound, 1 part by weight of active compound is mixed with the stated amount of solvent, the state amount of emulsifier is added and theh concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterised by the values 0 – 5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from the following Table A.

Table A

Pre-emergence test

| Active compound | Amount of active compound used, kg/ha | Sugar beet | Galinsoga | Urtica | Stellaria | Matricaria | Lolium |
| --- | --- | --- | --- | --- | --- | --- | --- |
| 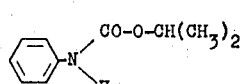 (known) | 10 | 2 | 2 | 4 | 4.5 | 3 | 5 |
|  | 5 | 1 | 1 | 4 | 4 | 2.5 | 5 |
|  | 2.5 | 0 | 0 | 2 | 2 | 1 | 4.5 |
| 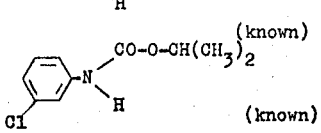 (known) | 10 | 4 | 4 | 5 | 4.5 | 4 | 5 |
|  | 5 | 4 | 3 | 5 | 4 | 3 | 5 |
|  | 2.5 | 3 | 1 | 4 | 4 | 2 | 5 |

Table A—Continued
Pre-emergence test

| Active compound | Amount of active compound used, kg/ha | Sugar beet | Galinsoga | Urtica | Stellaria | Matricaria | Lolium |
|---|---|---|---|---|---|---|---|
| compound (56) | 10 | 0 | 4 | 5 | 5 | 3.5 | 5 |
|  | 5 | 0 | 4 | 4.5 | 4 | 2 | 5 |
|  | 2.5 | 0 | 2 | 4.5 | 4 | 2 | 5 |
| compound (58) | 10 | 1 | 4 | 5 | 5 | 3 | 5 |
|  | 5 | 0 | 3 | 4 | 5 | 3 | 5 |
|  | 2.5 | 0 | 2 | 4 | 4 | 2 | 5 |

Pre-emergence test

| Active compound | Amount of active compound used kg/ha | Echino-chloa | Cheno-podium | Sina-pis | Stella-aria | Lolium | Galin-soga | Matri-caria | Cotton | Wheat | Maize |
|---|---|---|---|---|---|---|---|---|---|---|---|
| (known) | 10 | 4 | 2 | 2 | 4-5 | 5 | 2 | 3 | 2 | 5 | 5 |
|  | 5 | 2 | 1 | 0 | 4 | 5 | 1 | 2-3 | 1 | 5 | 4 |
|  | 2.5 | 0 | 0 | 0 | 2 | 4-5 | 0 | 1 | 1 | 4-5 | 3 |
|  | 1.25 | 0 | 0 | 0 | 1 | 4 | 0 | 0 | 0 | 4 | 2 |
| (known) | 10 | 5 | 4 | 4 | 4-5 | 5 | 4 | 4 | 2 | 4-5 | 4-5 |
|  | 5 | 5 | 4 | 3 | 4 | 5 | 3 | 3 | 2 | 4-5 | 4-5 |
|  | 2.5 | 5 | 3 | 3 | 4 | 5 | 1 | 2 | 1 | 4 | 3 |
|  | 1.25 | 4-5 | 2 | 2 | 3 | 4 | 0 | 1 | 0 | 2 | 3 |
| compound (41) | 10 | 5 | 5 | 5 | 5 | 5 | 5 | 5 | 1 | 1 | 2 |
|  | 5 | 5 | 5 | 4 | 4 | 5 | 5 | 5 | 0 | 0 | 1 |
|  | 2.5 | 5 | 4 | 3 | 4-5 | 5 | 5 | 3 | 0 | 0 | 0 |
|  | 1.25 | 4-5 | 4 | 3 | 4 | 4 | 4 | 2 | 0 | 0 | 0 |

It will be understood that the specfication and examples are illustrative but not limitative of the present invention and that other embodiments within the spirit and scope of the invention will suggest themselves to those skilled in the art.

What is claimed is:
1. N-aryl carbamic acid thiolester compound of the formula

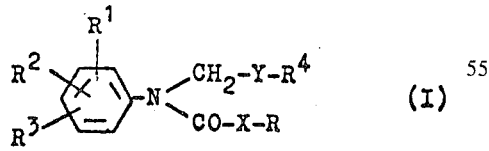

R is aliphatic hydrocarbyl, halo-aliphatic hydrocarbyl or hydroxy-aliphatic hydrocarbyl of 1 to 8 carbon atoms;
$R^1$, $R^2$ and $R^3$ are individually hydrogen, alkyl of up to 4 carbon atoms, cycloalkyl of from 5 to 7 carbon atoms, alkoxy of from 1 to 4 carbon atoms, haloalkyl of up to 2 carbon atoms, or halogen;
$R^2$ and $R^3$ taken together represent a $-(CH)_4-$ grouping to form a fused benzene ring with the phenyl ring of formula I;
X is sulfur;
Y is oxygen;
$R^4$ is straight-chain or branched alkyl of from 1 to 18 carbon atoms, haloalkyl of from 1 to 6 carbon atoms, alkenyl of from 2 to 10 carbon atoms, haloalkenyl of from 2 to 6 carbon atoms, alkynyl or haloalkynyl of from 3 to 6 carbon atoms, formyl, alkoxyalkyl or alkylthioalkyl of from 1 to 4 carbon atoms in the alkoxy or alkylthio moiety and 2 to 4 carbon atoms in the alkyl moiety, alkoxycarbonylalkyl or alkylthiocarbonylalkyl of from 1 to 4 carbon atoms in the alkoxy or alkylthio moiety and 1 to 10 carbon atoms in the alkyl moiety, alkylcarbonylalkyl of from 1 to 4 carbon atoms in the alkylcarbonyl moiety and 1 to 10 carbon atoms in the alkyl moiety, optionally substituted cycloalkyl or cycloalkenyl of from 5 to 8 carbon atoms, aryl of from 6 to 10 carbon atoms in the aryl moiety, aralkyl of from 6 to 10 carbon atoms in the aryl moiety and 1 to 4 carbon atoms in the alkyl moiety, aroxyalkyl or arylthioalkyl of from 6 to 10 carbon atoms in the aryl moiety and 1 to 4 carbon atoms in the alkyl moiety, or R⁴ can be the group

wherein
Z is oxygen and
R⁶ is the same as R⁴ except that R⁶ cannot be the groups

and formyl.

2. Compound as claimed in claim 1 wherein R in the formula is alkyl, hydroxyalkyl or haloalkyl of from 1 to 6 carbon atoms.

3. Compound as claimed in claim 1 wherein R in the formual is alkenyl, hydroxyalkenyl, or haloalkenyl of from 2 to 6 carbon atoms.

4. Compound as claimed in claim 1 wherein R in the formula is alkynyl, hydroxyalkynyl or haloalkynyl of from 3 to 6 carbon atoms.

5. Compound as claimed in claim 1 wherein R in the formula is alkoxyalkyl of from 1 to 4 carbon atoms in the alkoxy moiety and 1 to 6 carbon atoms in the alkyl moiety.

6. Compound as claimed in claim 1 wherein R in the fromula is arylalkyl of from 1 to 4 carbon atoms in the alkyl moiety and from 6 to 10 carbon atoms in the aryl moiety and wherein the aryl moiety may be substituted with halogen, alkyl or haloalkyl of from 1 to 4 carbon atoms or nitro.

7. Compound as claimed in claim 1 wherein R in the formula is cycloalkyl or cycloalkenyl of from 5 to 8 carbon atoms.

8. Compound as claimed in claim 1 wherein at least one of R¹, R², or R³ in the formula is hydrogen.

9. Compound as claimed in claim 1 wherein at least one of R¹, R² or R³ in the formula is alkyl of from 1 to 4 carbon atoms.

10. Compound as claimed in claim 1 wherein at least one of R¹, R² or R³ in the formula is cycloalkyl of from 5 to 7 carbon atoms.

11. Compound as claimed in claim 1 wherein at least one of R¹, R² or R³ in the formula is haloalkyl of from 1 to 2 carbon atoms.

12. Compound as claimed in claim 1 wherein R⁴ is alkyl of from 1 to 18 carbon atoms.

13. Compound as claimed in claim 1 wherein R⁴ is haloalkyl of from 1 to 6 carbon atoms.

14. Compound as claimed in claim 1 wherein R⁴ is alkenyl of from 2 to 10 carbon atoms.

15. Compound as claimed in claim 1 wherein R⁴ is haloalkenyl of from 2 to 6 carbon atoms.

16. Compound as claimed in claim 1 wherein R⁴ is alkynyl or haloalkynyl of from 3 to 6 carbon atoms.

17. Compound as claimed in claim 1 wherein R⁴ is formyl.

18. Compound as claimed in claim 1 wherein R⁴ is alkoxyalkyl or alkylthioalkyl of from 1 to 4 carbon atoms in the alkoxy or alkylthio moiety and from 2 to 4 carbon atoms in the alkyl moiety.

19. Compound as claimed in claim 1 wherein R⁴ is alkoxycarbonylalkyl or alkylthiocarbonylalkyl or alkylcarbonylalkyl containing a total of not more than 14 carbon atoms.

20. Compound as claimed in claim 1 wherein R⁴ is cycloalkyl or cyclalkenyl of from 5 to 8 carbon atoms.

21. Compound as claimed in claim 1 wherein R⁴ is aryl, aralkyl, aroxyalkyl or arylthioalkyl, in each case with 6 to 10 carbon atoms in the aryl moiety and 1 to 4 carbon atoms in any alkyl moiety, which aryl moiety can be substituted by fluorine, chlorine or bromine, or by straight-chain or branched alkyl with 1 to 3 carbon atoms, or by haloalkyl with 1 or 2 carbon atoms and 1 to 5 fluorine or chlorine atoms, or by straight-chain or branched alkoxy with 1 to 3 carbon atoms.

22. Compound as claimed in claim 1 wherein R⁴ is R⁶—CO— or R⁶—CS— wherein R⁶ is alkyl with up to 4 carbon atoms, haloalkyl with up to 4 carbon atoms and 1 or 2 halogen atoms, alkoxy with up to 3 carbon atoms or optionally substituted aryl or aralkyl with 6 carbon atoms in the aryl moiety and 1 or 2 carbon atoms in any alkyl moiety.

23. Compound as claimed in claim 1 wherein R⁴ R⁶—SO₂ wherein R⁶ is alkyl with up to 4 carbon atoms, haloalkyl with up to 4 carbon atoms and 1 or 2 halogen atoms, alkoxy with up to 3 carbon atoms or optionally substituted aryl or aralkyl with 6 carbon atoms in the aryl moiety and 1 or 2 carbon atoms in any alkyl moiety.

24. Compound as claimed in claim 1 wherein R⁴ is straight-chain or branched alkyl of from 1 to 18 carbon atoms, haloalkyl of from 1 to 6 carbon atoms, alkenyl of from 2 to 10 carbon atoms, haloalkenyl of from 2 to 6 carbon atoms, alkynyl or haloalkynyl of from 3 to 6 carbon atoms, formyl alkoxyalkyl or alkylthioalkyl of from 1 to 4 carbon atoms in the alkyl moiety, alkoxycarbonylalkyl or alkylthiocarbonylalkyl of from 1 to 4 carbon atoms in the alkoxy or alkylthio moiety and 2 to 4 carbon atoms in the alkyl moiety, alkoxycarbonylalkyl or alkylthiocarbonylalkyl of from 1 to 4 carbon atoms in the alkoxy or alkylthio moiety and 1 to 10 carbon atoms in the alkyl moiety, alkylcarbonylalkyl of from 1 to 4 carbon atoms in the alkylcarbonyl moiety and 1 to 10 carbon atoms in the alkyl moiety, optionally substituted cycloalkyl or cycloalkenyl of from 5 to 8 carbon atoms, aryl of from 6 to 10 carbon atoms in the aryl moiety, aralkyl of from 6 to 10 carbon atoms in the aryl moiety and 1 to 4 carbon atoms in the alkyl moiety, aroxyalkyl or arylthioalkyl of from 6 to 10 carbon atoms in the aryl moiety and 1 to 4 carbon atoms in the alkyl moiety.

25. Compound as claimed in claim 1 wherein R⁴ is

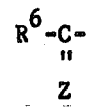

wherein Z is oxygen and R⁶ is the same as R⁴ except that R⁶ cannot be the groups

and formyl.

26. Compound as claimed in claim 1 wherein said compound is designated N-methoxymethyl-N-phenyl-thiol carbamic acid isopropyl ester.

27. Compound as claimed in claim 1 wherein said compound is designated N-ethoxymethyl-N-(3-chlorophenyl)- thiol carbamic acid n-butyl ester.

28. Compound as claimed in claim 1 wherein said compound is designated N-propargyloxymethyl-N-(3-chlorophenyl)-thiol carbamic acid isopropyl ester.

29. Compound as claimed in claim 1 wherein said compound is designated N-ethoxymethyl-N-(3-chlorophenyl)-thio carbamic acid 2-chloroethyl ester.

30. Compound as claimed in claim 1 wherein said compound is designated N-isopropoxymethyl-N-(3-chlorophenyl)-thiol carbamic acid n-butyl ester.

* * * * *

UNITED STATES PATENT OFFICE
CERTIFICATE OF CORRECTION

Patent No. 3,869,490                    Dated March 4, 1975

Inventor(s) Gerhard Jager et al.

It is certified that error appears in the above-identified patent and that said Letters Patent are hereby corrected as shown below:

Title of invention should read -- ESTERS OF N-SUBSTITUTED ALKOXY METHYLENE CARBAMILIC ACID --.

Signed and Sealed this seventh Day of October 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,869,490  Dated March 4, 1975

Inventor(s) Gerhard Jager et al  Page - 2

It is certified that error appears in the above-identified patent and that said Letters Patent are hereby corrected as shown below:

Column 3, line 33, delete "alkyloralkenyl"

and substitute therefor --alkyl or alkenyl--.

Column 5, line 17
after S-ethyl ester, insert the following: --N-chloromethyl-N-(3-chlorophenyl)-thiocarbamic acid S-propyl ester,--.

Column 8, line 1 delete "4.05 g"

and substitute therefor --40.5 g--.

Column 8, line 51, delete "cours of course"

and substitute therefor --course of 15--.

Column 8, line 61 delete "1380°C"

and substitute therefor --138°C--.

UNITED STATES PATENT OFFICE
CERTIFICATE OF CORRECTION

Patent No. 3,869,490  Dated March 4, 1975

Page - 3

Inventor(s) Gerhard Jager et al

It is certified that error appears in the above-identified patent and that said Letters Patent are hereby corrected as shown below:

Columns 13 and 14 -
Table 2 - Examples 72 through 87
should appear as shown on the attached sheets.

Column 21, line 58, delete "plate"
and insert therefor --plant--.

Column 21, line 65, delete "dicotylidons"
and insert therefor --dicotyledons--.

Column 23, line 35
after 0.1 to 95, insert --preferably 0.5 to 90,--.

Signed and Sealed this seventh Day of October 1975

[SEAL]

Attest:

RUTH C. MASON
*Attesting Officer*

C. MARSHALL DANN
*Commissioner of Patents and Trademarks*

2 – continuation $$R^6-C(=Z)-Y-CH_2-N-CO-X-R$$ with phenyl ring bearing $R^1$, $R^2$, $R^3$

| Example Number | R | X | $R^1$ | $R^2$ | $R^3$ | Y | Z | $R^6$ | Melting Point [°C] / Boiling Point [°C/mm Hg] / Refractive Index [$n_D^{20}$] |
|---|---|---|---|---|---|---|---|---|---|
| 72 | $(CH_3)_2CH$ | O | 3-Cl | H | H | O | O | $C_4H_9$ | 155/0,4 |
| 73 | $(CH_3)_2CH$ | O | 3-Cl | H | H | O | O | $(C_2H_5)(CH_3)CH$ | 147/0,4 |
| 74 | $(CH_3)_2CH$ | O | 3-Cl | H | H | O | O | $(CH_3)_2CH$ | 142/0,5 |
| 75 | $(CH_3)_2CH$ | O | 3-Cl | H | H | O | O | $(CH_3)_3C$ | 142/0,5 |
| 76 | $(CH_3)_2CH$ | O | 3-Cl | H | H | O | O | $ClCH_2$ | 1,5184 |
| 77 | $(CH_3)_2CH$ | O | 3-Cl | H | H | O | O | $Cl_2CH$ | 1,5203 |
| 78 | $(CH_3)_2CH$ | O | 3-Cl | H | H | O | O | $CCl_3$ | 1,5249 |
| 79 | $(CH_3)_2CH$ | O | 3-Cl | H | H | O | O | $CH_3CCl_2$ | 1,5146 |
| 80 | $(CH_3)_2CH$ | O | 3-Cl | H | H | O | O | $C_6H_5$ | 51 |

Table 2 - continuation $$R^6-C(=Z)-Y-CH_2-N(-CO-X-R)-\text{Ar}(R^1, R^2, R^3)$$

| Example Number | R | X | $R^1$ | $R^2$ | $R^3$ | Y | Z | $R^6$ | Melting Point [°C] Boiling Point [°C/mm Hg] Refractive Index [$n_D^{20}$] |
|---|---|---|---|---|---|---|---|---|---|
| 81 | $(CH_3)_2CH$ | O | 3-Cl | H | H | O | O | $C_6H_5CH_2$ | 1,5374 |
| 82 | $(CH_3)_2CH$ | O | 2-$CH_3$O | H | 5-Cl | O | O | $CH_3$ | 1,5086 |
| 83 | $(CH_3)_2CH$ | O | 2-$CH_3$ | H | 5-Cl | O | O | $CH_3$ | 1,5049 |
| 84 | $ClCH_2CH_2$ | O | 3-Cl | H | H | O | O | $CH_3$ | 160/0,1 |
| 85 | $ClCH_2CH_2$ | O | 3-Cl | H | H | O | O | $ClCH_2$ | 188/0,1 |
| 86 | $C_2H_5$ | S | 3-Cl | 4-Cl | H | O | O | $CH_3CCl_2$ | 1,5730 |
| 87 | $(CH_3)_2CH$ | O | H | H | H | O | O | H | 117/0,35 |